United States Patent
Dhome

(10) Patent No.: US 8,781,168 B2
(45) Date of Patent: Jul. 15, 2014

(54) DEVICE FOR UPDATING A PHOTOMETRIC MODEL

(75) Inventor: Yoann Dhome, Antony (FR)

(73) Assignee: Commissariat a l'Energie Atomique et aux Energies Alternatives, Paris (FR)

(*) Notice: Subject to any disclaimer, the term of this patent is extended or adjusted under 35 U.S.C. 154(b) by 194 days.

(21) Appl. No.: 13/578,143

(22) PCT Filed: Feb. 4, 2011

(86) PCT No.: PCT/EP2011/051687
§ 371 (c)(1),
(2), (4) Date: Aug. 9, 2012

(87) PCT Pub. No.: WO2011/098410
PCT Pub. Date: Aug. 18, 2011

(65) Prior Publication Data
US 2012/0314906 A1      Dec. 13, 2012

(30) Foreign Application Priority Data

Feb. 9, 2010   (FR) ...................................... 10 00526

(51) Int. Cl.
*G06K 9/62*      (2006.01)

(52) U.S. Cl.
USPC ........................................................ 382/103

(58) Field of Classification Search
None
See application file for complete search history.

(56) References Cited

U.S. PATENT DOCUMENTS

| | | | |
|---|---|---|---|
| 4,903,192 A | 2/1990 | Saito et al. | |
| 5,043,862 A * | 8/1991 | Takahashi et al. | 700/42 |
| 5,825,478 A * | 10/1998 | Wilcox et al. | 356/73 |
| 2007/0280540 A1 * | 12/2007 | Ikeda | 382/195 |

OTHER PUBLICATIONS

Image Change Detection Algorithms: Systematic Survey. Richard J. Radke, Srinivas Andra, Omar Al-Kofahi, and Badrinath Roysam. IEEE Mar. 2005.*
Til Aach, et al., "Statistical Model-Based Change Detection in Moving Video", Signal Processing, Mar. 2005, pp. 165-180, vol. 31, No. 2, Elsevier Science Publishers B.V., Amsterdam, NL, XP000345437.
Richard J. Radke, et al., "Image Change Detection Algorithms: A Systematic Survey", IEEE Transactions on Image Processing, Mar. 2005, pp. 294-307, vol. 14, No. 3, XP002602265.

* cited by examiner

*Primary Examiner* — Stephen R Koziol
*Assistant Examiner* — Delomia Gilliard
(74) *Attorney, Agent, or Firm* — Baker Hostetler LLP

(57) ABSTRACT

A photometric model includes at least one Gaussian model of a measurable physical magnitude in an image supplied by the camera and it is defined by the mean and the variance of the physical magnitude. A device comprises: means for computing the mean based on the current value of the physical magnitude, these means including a first summer mounted in a closed loop; means for measuring the difference between the mean and the current value of the physical magnitude, these means including a second summer; means for reducing the difference, these means including an automatic regulator. The first summer, the second summer and the automatic regulator are assembled in a closed-loop control of the first summer so as to update the model slowly in a period of stability of the observed scene and rapidly in a period of transition of the observed scene. Application: video surveillance, background subtraction.

7 Claims, 1 Drawing Sheet

DEVICE FOR UPDATING A PHOTOMETRIC MODEL

CROSS-REFERENCE TO RELATED APPLICATIONS

This application is a National Stage of International patent application PCT/EP2011/051687, filed on Feb. 4, 2011, which claims priority to foreign French patent application No. FR 1000526, filed on Feb. 9, 2010, the disclosures of which are incorporated by reference in their entirety.

FIELD OF THE INVENTION

The present invention relates to a device for updating a photometric model. It applies notably in the field of video surveillance by fixed camera, more particularly in the field of background subtraction in automated analysis of the video streams. It involves essentially automatically identifying objects moving in a video stream.

BACKGROUND

Many applications for processing images seek to detect events in the video streams. A conventional technique consists in modeling from a photometric point of view the appearance of the empty scene which will be called the background model hereinafter. Any moving object appearing in the image then has inconsistencies relative to this background model and can therefore be detected.

The current techniques propose modeling of the background in the pixels or by blocks of pixels. In a first phase, on each pixel or block of pixels, a certain number of parameters are computed in order to encode the information locally. These are parameters of color, of texture or else of orientation of the gradient. During a second phase, called the phase of segmentation of the objects of interest, the current image is compared with the previously created model, the zones revealing differences being associated with probable objects of interest. For example, a fixed camera can be used to analyze road traffic. A model of the empty road and of the verges is constructed which consists in describing each pixel or block of pixels of the image. When vehicles enter the field of view of the camera, the pixels corresponding to the vehicles are different from those that have been used to generate the model. The difference between the image and the model, obtained by "background subtraction", makes it possible to detect and segment the vehicles.

In addition to the problems of sensitivity preventing the detection of objects with photometric properties close to their environment, such as a gray vehicle on a gray road, another difficulty lies in updating the background model. Specifically, variations in the ambient luminosity create differences between the current image and the model without the objects of interest being present. The variations in the ambient luminosity are usually due to the changes in sunlight, to cloudy periods, precipitation or else to the action of the wind. These changes have to be incorporated, that is to say the model has to be updated dynamically in order to adapt it to the variations of the observed scene while maintaining the level of detection performance.

In attempts to solve this problem, several approaches propose using, in order to model the background and encode the variability of each parameter, a model called "Gaussian mixture", this model including several Gaussian models each having a mean and a variance. These statistical systems operate quite well and support reasonable variations such as the variations in the luminosity during the day or the movement of the wind in a tree. But a difficulty lies in the speed of updating of these Gaussian models in order to follow the largest variations, the theory underlying these approaches being based on a slow and regular updating of the Gaussian model. Therefore, these systems currently do not succeed in managing the effects of events such as cloudy periods or snow falls.

In an attempt to solve this problem, F. Porikli describes, in an article entitled "Human body tracking by adaptive background models and mean-shift analysis", a method in which the updating of a single Gaussian model, representing the background of the observed scene, is dependant on the "activity" in the image, in other words on the variability over time of the scene. In order to evaluate this "activity", the author defines a criterion of change in luminosity in the image. Above a previously set threshold, a learning coefficient is modified proportionally to the change in luminosity. Unfortunately, this approach has two major defects. First of all, the criterion of change in luminosity is computed over the whole of the image. Therefore in the case of a cloudy period, for example, the variation in luminosity is not global but local in the scene and therefore in the image. Moreover, the very principle of threshold based on which the learning coefficient is modified poses a problem since it is determined empirically and therefore subjectively with no rule or theoretical criterion to which to be attached.

SUMMARY OF THE INVENTION

The main object of the invention is to alleviate the aforementioned drawbacks. It departs from the finding that the Gaussian models currently used to model the background are probabilistic models. As such, in order to reflect a certain reality, it is necessary to respect the fundamentals of probabilistic mathematics. Therefore, in order to be able to be considered pertinent, a Gaussian model must model a sufficient quantity of data. Conversely, a Gaussian model must also be adapted sufficiently rapidly to retain its pertinence following considerable changes in illumination in the modeled scene.

On the one hand, the learning coefficient must therefore not be fixed, but it must be adapted as a function of the variations of the incoming data, while taking account of the history. On the other hand, even though, in certain situations, the variations in illumination to be modeled are global, in many situations they are local phenomena. The speed of updating of the model must therefore depend on local parameters.

On the basis of this double finding, the invention proposes a strategy for updating a Gaussian model that is dependent on the local dynamic of the scene and therefore more inclined to respond to rapid changes in luminosity. Accordingly, the subject of the invention is a device for updating a photometric model of a scene observed by a camera. The photometric model includes at least one Gaussian model of a measurable physical magnitude in a pixel or in a block of pixels of an image supplied by the camera. The Gaussian model is defined by the mean and the variance of the physical magnitude. The device comprises means for computing the mean based on the current value of the measured physical magnitude in the pixel or the block of pixels of the image, these means including a first summer mounted in a closed loop. The device also comprises means for measuring the difference between the mean and the current value of the physical magnitude, these means including a second summer. The device also comprises means for reducing the difference, these means including an automatic regulator. The first summer, the second summer and the automatic regulator are assembled in a closed-loop control of the first summer, so as to update the model slowly in a period of stability of the observed scene and rapidly in a period of transition of the observed scene. Therefore, the model remains true to the observed scene irrespective of the speed of fluctuation of the physical magnitude. The automatic regulator includes a PI (Proportional-Integral) or PD (Proportional-Derivative) or PID (Proportional-Integral-Derivative) regulator.

For example, with the camera being able to be fixed, the observed scene may be a background scene and the device may comprise means for subtracting the photometric model from the image supplied by the camera so as to detect, in said image, events superposed on the background scene.

For example, the physical magnitude may be the luminosity or a color component.

For example, the PID regulator may be regulated by the Takahashi method.

In another preferred embodiment, the automatic regulator may include a proportional corrector, a PID corrector and at least one selector for switching to the proportional corrector during the periods of stability of the observed scene and switching to the PID corrector during the periods of transition of the observed scene.

Advantageously, the selector may switch to the PID corrector if an improbable event is detected and switch to the proportional corrector if no improbable event is detected during a predetermined period of time. For example, an improbable event may be an event having a probability of occurrence that is below a predetermined threshold.

In addition to keeping the background model pertinent despite the changes in luminosity and making it possible to use the background model permanently, the invention also has the main advantages that it allows robust and reliable background subtraction systems that are of simple design and require no prior and empirical calibration of a multitude of thresholds and parameters.

BRIEF DESCRIPTION OF THE DRAWINGS

Other features and advantages of the invention will emerge with the aid of the following description made with respect to the appended drawings which represent.

DETAILED DESCRIPTION

Although, at first sight, choosing to model a noisy signal such as a video stream by a simple Gaussian, characterized by its mean and its variance, is an appropriate idea, the study of multiple video sequences leads to calling this principle into question. Specifically, sudden variations in various physical magnitudes may be observed, whether they be for example linear variations or through levels of luminosity or else RGB (Red, Green, Blue) or HSV (Hue, Saturation and Value) color components which cannot be modeled by such an approach. Therefore the hypothesis according to which the ideal model for modeling the background of a sequence is a Gaussian model is not always exact.

Two types of clearly distinct periods over time may be identified in video signals. The first, which will hereinafter be called the periods of "stability" of the observed scene, are able to be modeled perfectly well by a Gaussian model. The second, which will hereinafter be called periods of "transition" of the observed scene, encompass all the moments of great variations. One object of the invention is to respond to this duality by updating the background model slowly in a period of stability and rapidly in a period of transition. For this, the invention proposes considering the background, which it is desired to "model as well as possible", as an evolving entity onto which a Gaussian model is locked by virtue of the information provided by each image. The updating can therefore be seen as a problem of automatic control. When automatic, a control is a method of which the main object is to stabilize and improve the reaction of a system relative to its set point. The basic principle of a control system is to measure the difference between the real value of the physical magnitude to be controlled and a set point value that it is desired to achieve, and to compute the appropriate command applied to one or more actuators so as to reduce this difference.

Figure 1:
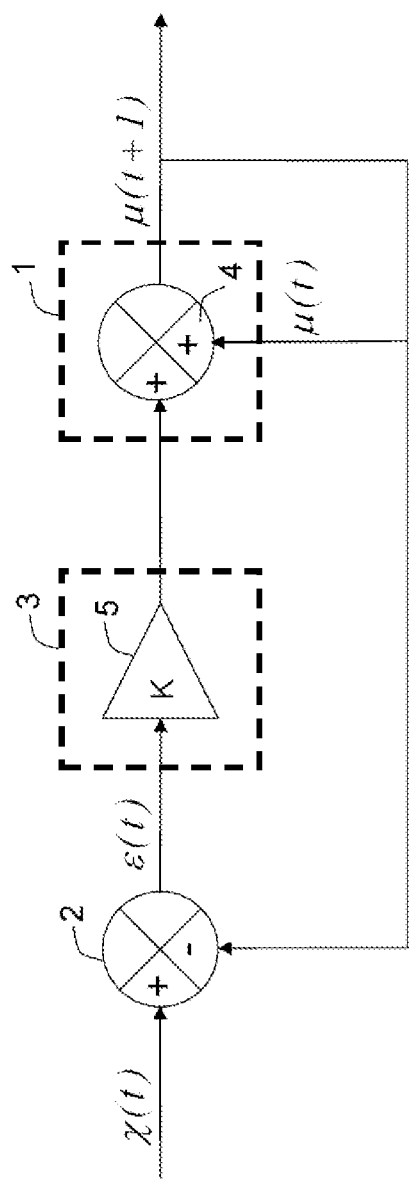
FIG. 1, by a block diagram, an exemplary embodiment of a conventional control device.

FIG. 1 illustrates by a block diagram an exemplary embodiment of a conventional device that can be used to control a system 1 which may advantageously comprise a summer 4, the summer 4 being able to be mounted in a closed loop (its output and its input being connected directly) so as to compute the weighted mean $\mu$ of the Gaussian of the samples that it receives. Therefore, the system 1 can be used to implement a background model. Here again advantageously, the system 1 can itself be assembled in a closed-loop control with the aid of a summer 2. Therefore, at the current moment t, the closed-loop control receives as an input from the summer 2 a sample $\chi(t)$. At the moment t+1, the closed-loop control supplies as the output of the system 1 the weighted mean of the Gaussian of the samples up to the moment t, this mean being written as $\mu(t+1)$. The summer 2 supplies as the output the error at the current moment t between the sample $\chi(t)$ at the moment t and the weighted mean of the samples up to the moment t, this error being written as $\epsilon(t)$. In other words, $\epsilon(t)=\chi(t)-\mu(t)$. The closed-loop control also comprises a correction device 3 which includes a proportional corrector 5 of learning coefficient k placed so as to receive $\epsilon(t)$ as the input. The proportional corrector 5 makes it possible to correct the error $\epsilon(t)$ so that $\mu(t+1)=\mu(t)+y(t)$ where $y(t)=k*\epsilon(t)$ is the term of correction.

The drawbacks of such a device comprising only one proportional corrector are known, notably its limited response times and the persistence of a static error. Specifically, the new incoming data, multiplied by a weighting coefficient, is incorporated into the Gaussian with the aid of a simple addition. As a result, this model is not very effective when the system 1 is a background model, more particularly during its transition periods. Specifically, if the weighting coefficient k, regulated empirically, is too low, it cannot follow the rapid variations that may be observed in a video stream. Conversely, a coefficient k that is too high jeopardizes the consistency of the model both from the theoretical point of view and with respect to the practical results, the model drifting too easily. Based on this finding, the present invention proposes to replace the proportional corrector 5 with a more complex module making it possible to update a background model slowly in a period of stability and rapidly in a period of transition as illustrated below.

Figure 2:
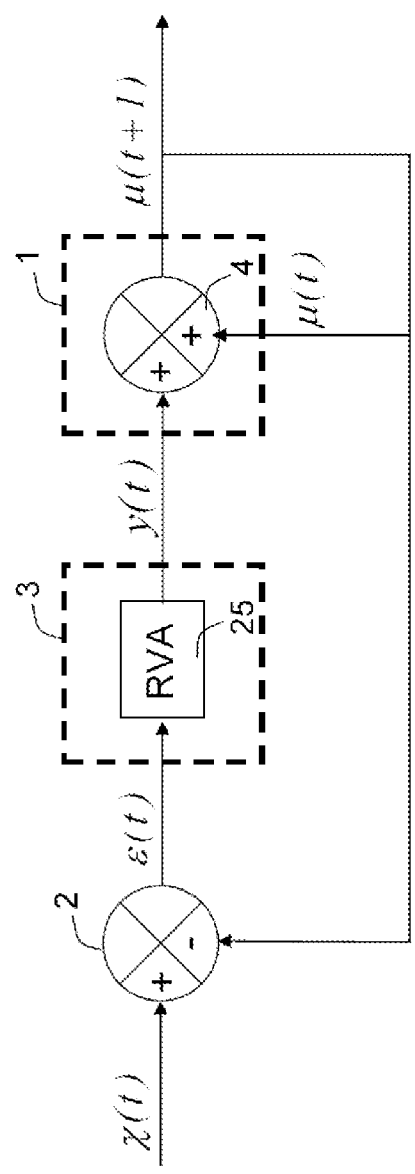
FIG. 2, by a block diagram, the principles of a control device of a background model according to the invention.

FIG. 2 illustrates, by a block diagram, the principles of a device according to the invention for controlling the system 1 which implements a background model, so as to update the model slowly in a period of stability and rapidly in a period of transition. It may involve using, advantageously, instead of the proportional corrector 5 illustrated in FIG. 1, a module 25 for regulating the learning speed which will be simply called "RVA" hereinafter for "learning speed regulator". The RVA 25 according to the invention can be implemented in several ways based on automatic regulators. As explained below, the RVA 25 may advantageously be produced from a Proportional-Integral-Derivative (PID) corrector. But the RVA 25 may also be made from an internal-model command, a command by status return, an RST corrector, a quadratic linear command (LQ), a Gaussian quadratic linear command (LQG) or else an infinite H command. The RVA 25 may also be produced from a predictive command being based on the use of a dynamic model of the system in order to anticipate its future behavior. The RVA 25 may also be made from a robust command making it possible to ensure stability relative to the model disruptions and errors. The RVA 25 may also be produced from an adaptive command which carries out a real time identification in order to update the model of the system. The RVA 25 may also be made from a neural network or an expert system. The RVA 25 may also be made from nonlinear controllers using the Aleksandr Lyapunov theory, such as the linearizing commands or the sliding modes command. The RVA 25 may also be made from a command by differential platitude which makes it possible to invert the model without going through the integration of the differential equations and therefore of computing the necessary signals on the inputs in order to ensure the desired trajectories at the output. In all the embodiments of the invention, it involves controlling the Gaussian background model based on the information provided by each image, by virtue of a regulator drawn from the automatic world. Therefore, it may involve, as in the preferred exemplary embodiment that follows, a regulator based on a PID corrector. But it will not escape those skilled in the art that the PID corrector of the exemplary embodiment that follows may be replaced by a simpler corrector, such as a PI corrector or a PD corrector without departing from the principles of the invention.

In an exemplary closed-loop control device according to the invention, the RVA 25 may advantageously be implemented from a PID corrector. PID correctors are known for their good correction performance and their robustness. The error term $\epsilon(t)$ is no longer simply multiplied by a constant but by three distinct effects, the updating equation being as follows:

$$\mu_{n+1} = \mu_n + k_p \left( \varepsilon_n + k_i \sum_{k=-\infty}^{n} \varepsilon_k + k_d \frac{d\varepsilon_n}{dn} \right)$$

where $\varepsilon_n = x_n - \mu_n$

Three actions are applied to correct the estimate of the mean $\mu$. The coefficient proportional term $k_p$ has the same effect as the rate of learning k of FIG. 1. It provides the main correction. The derivative effect of coefficient $k_p \cdot k_d$ allows the algorithm to react rapidly to the appearance of a disruption. When the data evolve rapidly, the derivative term is considerable. This action makes it possible to obtain a rapid evolution when a considerable error appears. Finally, the integral action of coefficient $k_p \cdot k_i$ is a long-term action. In theory, it asymptotically cancels out the error. This action therefore makes it possible to eliminate the static error. In the present exemplary embodiment, this action makes it possible to eliminate the long-term error between the data and the mean $\mu$.

The choice of the coefficients $k_p$, $k_i$ and $k_d$ is considerable. Specifically, an incorrect adjustment may cause unstable responses. In the present exemplary embodiment, the Takahashi identification and adjustment method may advantageously be used to choose $k_p$, $k_i$ and $k_d$. Specifically, this method, based on simple identification tests, makes it possible to determine the adjustments of coefficients of which the properties are known. In particular, this method is recognized for providing a rapid and stable response.

In another example of a control device according to the invention, the RVA 25 can be advantageously implemented from a proportional corrector coupled to a PID corrector. As explained above, the video signals comprise periods of stability and periods of transition. In the present exemplary embodiment, the proportional corrector manages the updating of the background model in a stable period, while the PID corrector manages the updating of the background model in a period of transition. The coupling of the proportional corrector and of the PID corrector can be carried out by virtue of selection modules which will be simply called "selectors" hereinafter. In view of the state of the system 1 and of the incoming data $\chi(t)$, the selectors make it possible to use one or other of the two correctors.

The selectors may advantageously define the corrector to be used, that is to say the proportional corrector or the PID corrector, depending on the situation: in a period of stability the updating can be carried out with the aid of the proportional corrector, whereas in a period of transition, it can be carried out with the aid of the PID corrector. To make this choice, the selectors may advantageously be based on rules of probability. The default operation may be the use of the proportional corrector. The Gaussian model used to model the background is then valid. The switching can be carried out when the Gaussian model is taken as the default in terms of statistics. For example, a detection threshold may be arbitrarily set at 1/1000. Thus, the selectors may consider that, if an improbable event, for example having less than one chance out of 1000 of occurring, is detected, then the Gaussian model is taken as the default. The return to the stable mode can be carried out when the Gaussian model is again pertinent, for example when no improbable event has occurred over a determined period of time. In the present embodiment, the selectors may therefore contain a certain number of probability rules for testing the setting to default and the pertinence of the Gaussian model for the purpose of choosing which corrector to use.

During the periods of long term stability, the device therefore operates exactly as explained in FIG. 1 by virtue of the proportional corrector. Specifically, the new incoming data, multiplied by a weighting coefficient, is incorporated into the Gaussian representing the background with the aid of a simple addition. The equation for updating the mean $\mu$ of the model is as follows:

$$\mu_{n+1} = \alpha \cdot x_n + (1-\alpha) \cdot \mu_n = \alpha \cdot x_n + (1-\alpha) \cdot \alpha \cdot x_{n-1} + (1-\alpha)^2 \cdot \alpha \cdot x_{n-2} + \ldots$$

The equation for updating the variance is identical. Therefore with a learning ratio of 0.01, the incoming data has a weight that is equal to only 1% of the total. On the other hand, during the periods of short term transition, the device operates as explained above by virtue of the PID corrector.

As mentioned above, the PID corrector of the preferred exemplary embodiment above can be replaced by a simpler corrector, such as for example a PI corrector or a PD corrector.

The present invention therefore proposes a completely new interpretation of the role of the updating of the Gaussian model. Hitherto, the updating of the model was seen to be a step consisting in enriching the population of samples that must be modeled: attributed to each new item of data is a weighting that reflects the confidence or the importance that is placed on this sample in the global population. The present invention proposes rather to consider the background, which must be modeled as well as possible, to be an evolving entity onto which a Gaussian model is locked, by virtue of the information provided by each image. For this, the invention makes use of regulators inspired by the industrial automatic world, which make it possible to update the Gaussian model as a function only of the variability of the incoming data, that is to say without programming or empirical threshold, while respecting as well as possible the mathematical constraints imposed by the Gaussian probabilistic model. Thus, the invention uses, in the computation of the updating of the Gaussian model, not only a proportional error correction, that is to say proportional to the difference between the model and the current data, but also and above all a set of techniques which make it possible to control a physical magnitude.

In other words, it involves using complex regulators inspired by the industrial automatic world in order to update a photometric model. The photometric model, which represents the system to be regulated, is thus controlled on the incoming image data; which represent the set points.

The device according to the invention described above also has as its main advantages that the only data necessary for it to operate are, in addition to the mean and variance of the Gaussian model, the data supplied by the current image analysis. And it supplies as an output a new Gaussian model defined by its mean and its variance. Moreover, to operate it uses only local data of the image.

The invention claimed is:

1. A device for updating a photometric model of a scene observed by a camera, the photometric model including at least one Gaussian model of a measurable physical magnitude in a pixel or in a block of pixels of an image supplied by the camera, the Gaussian model being defined by the mean and the variance of the physical magnitude, the device comprising:
   means for computing the mean based on the current value of the measured physical magnitude in the pixel or the block of pixels of the image, said means including a first summer mounted in a closed loop, and;
   means for measuring the difference between the mean and the current value of the physical magnitude, said means including a second summer, and;
   means for reducing the difference, said means including an automatic regulator;
   the first summer, the second summer and the automatic regulator being assembled in a closed-loop control of the first summer so as to update the model slowly in a period of stability of the observed scene and rapidly in a period of transition of the observed scene, so that the model remains true to the observed scene irrespective of the speed of fluctuation of the physical magnitude, the device being characterized in that the automatic regulator includes a PI or PD or PID regulator.

2. The device as claimed in claim 1, wherein, the camera being fixed, the observed scene is a background scene and the device comprises means for subtracting the photometric model from the image supplied by the camera, so as to detect, in said image, events superposed on the background scene.

3. The device as claimed in claim 1, wherein the physical magnitude is the luminosity or a color component.

4. The device as claimed in claim 1, wherein the PID regulator is regulated by the Takahashi method.

5. The device as claimed in claim 1, wherein the automatic regulator includes:
   a proportional corrector, and;
   a PID corrector, and;
   at least one selector for:
   switching to the proportional corrector during the periods of stability of the observed scene, and;
   switching to the PID corrector during the periods of transition of the observed scene.

6. The device as claimed in claim 5, wherein the selector:
   switches to the PID corrector if an improbable event is detected;
   switches to the proportional corrector if no improbable event is detected during a predetermined period of time.

7. The device as claimed in claim 6, wherein an improbable event is an event having a probability of occurrence that is below a predetermined threshold.

* * * * *